United States Patent [19]

Kinsman

[11] 3,832,731
[45] Aug. 27, 1974

[54] PHOTOGRAPHIC FILM ASSEMBLAGE
[75] Inventor: Gordon F. Kinsman, Billerica, Mass.
[73] Assignee: Polaroid Corporation, Cambridge, Mass.
[22] Filed: Apr. 26, 1973
[21] Appl. No.: 354,735

[52] U.S. Cl. ............................... 354/304, 96/76 C
[51] Int. Cl. ............................................. G03b 19/10
[58] Field of Search ............ 95/13, 19; 354/301, 84, 354/85, 304

[56] References Cited
UNITED STATES PATENTS
3,264,963  8/1966  Finelli ............................ 95/13
3,479,184  11/1969  Land et al. ..................... 95/13 X
3,672,272  6/1972  Cole ............................... 95/13

Primary Examiner—Richard M. Sheer
Attorney, Agent, or Firm—John S. Vale

[57] ABSTRACT

A photographic film assemblage including a container, at least one "self-developing" film unit within the container which is adapted to be exposed and then treated with a fluid processing composition, and structure associated with the container, so as to form an integral part of the assemblage, for controlling the distribution of the fluid within the film unit during treatment.

31 Claims, 8 Drawing Figures

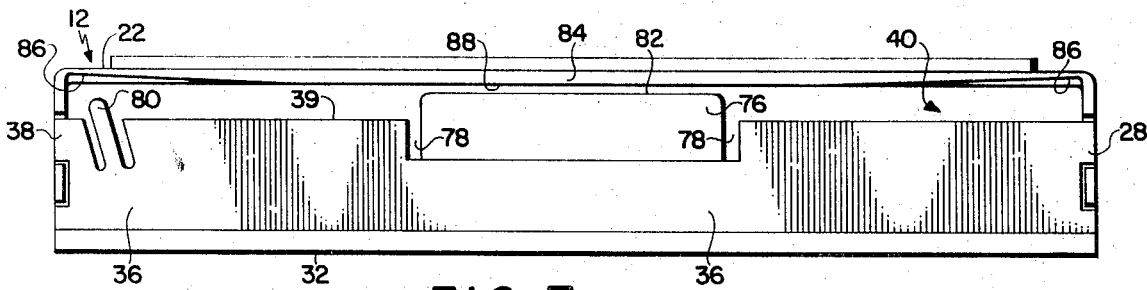
FIG. 7
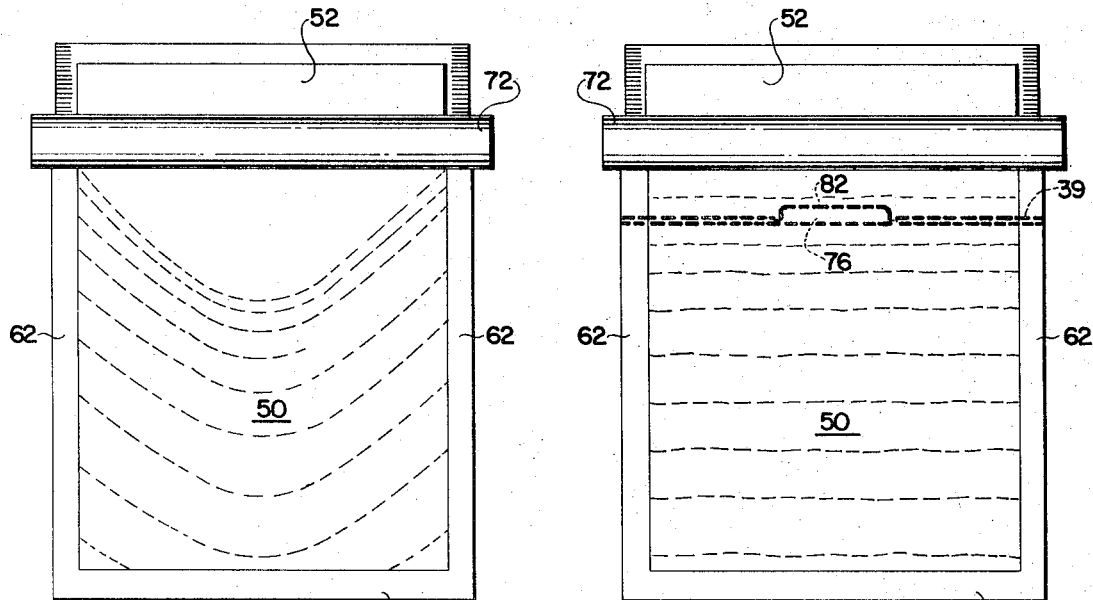
FIG. 5
FIG. 6

PHOTOGRAPHIC FILM ASSEMBLAGE

FIELD OF THE INVENTION

The present invention relates to the field of photography and, more specifically, to photographic film assemblages including "self-developing" film units.

BACKGROUND OF THE INVENTION

An important step in processing a self-developing film unit is the distribution of a fluid, preferably a liquid processing composition between and contact with opposed or superposed sheet-like elements of an exposed self-developing film unit to initiate a diffusion transfer process. In order to obtain an optimum quality positive print, the distributed layer of processing composition should cover the entire photoexposed area and be uniform in thickness.

In one embodiment, the film unit comprises a first sheet-like element having one or more photosensitive layers thereon and a second sheet-like element having one or more image-receiving layers thereon. Subsequent to exposure of the photosensitive first sheet, the second sheet is brought into face-to-face superposition with the first sheet and the processing fluid is spread between an adjacent pair of predetermined layers. After development and positive image formation, the sheets are separated to view the positive image on the second sheet.

In another embodiment, the first and second sheet-like elements form a laminate and the photosensitive layer or layers are exposed through a transparent section of one of the elements. The image-receiving layers or layers are incorporated in the laminate and subsequent to the fluid distribution, the positive print may be viewed through the same transparent section without having to peel apart separable elements of the film unit.

Both types of film units include a rupturable container or pod of fluid processing composition at one end of the film unit from which the fluid is dispensed and distributed in a thin layer in response to passing the film unit, pod first, between a pair of pressure applying members.

In a typical self-developing photographic system, the film units are arranged in stacked relation within a film container which is adapted to be inserted into the receiving chamber of an appropriate camera to locate the forwardmost film unit in the stack in position for exposure.

Subsequent to exposure, the forwardmost film unit is advanced through a withdrawal slot in the container, pod first, and into engagement with a pair of pressure applying members mounted within the camera. The pressure applying members exert a compressive force on the pod causing it to rupture and discharge the fluid between the predetermined adjacent layers at the leading end of the photo-exposed area. Continued advancement of the film unit between the pressure applying members results in the fluid being advanced along a liquid wave front toward the trailing end of the film unit such that it is progressively distributed over the entire photo-exposed area of the film unit.

The uniformity of the liquid layer is, to a large degree, determined by the initial shape of the liquid wave front. In order to uniformly spread the processing composition over a substantially rectangular or square photo-exposed area, it is preferable that the wave front be disposed in a substantially straight line which extends outwardly to the lateral margins of the area and is oriented in a direction that is normal to the direction of film advancement between the pressure applying members.

There are several factors which effect the initial shape of the wave front. One is a design of the pod and its rupture characteristics. Another relates to the viscosity and amount of liquid enclosed by the pod. The wave front shape is also influenced by the velocity at which the film unit is advanced through the pressure applying members, the amount of compressive pressure exerted on the film unit, and the resistance to fluid flow at the interfaces between the liquid and the predetermined layers.

One of the most commonly observed spread shapes is a tongue shape wherein the wave front progresses towards the trailing end more rapidly in the central portion of the photo-exposed or image-forming area than out at the lateral margins. This condition is most likely caused by the relatively low resistance to fluid flow at the center of the film unit compared to the flow resistance at the lateral margins. The difference in the flow resistance can be attributed to the fact that the lateral edges of the superposed sheet-like elements are held together by binding tape or structure within the camera while the central portion of the sheets are not so restrained and may more easily separate or delaminate to accommodate the mass of fluid discharged from the pod.

Due to the concentration of fluid at the center of the film unit, it is possible that the corners at the rear or trailing end of the image-forming area may not be completely covered during the subsequent spreading operation.

One method employed to compensate for the tongue-shaped wave front has been to equip the camera or film container with spread control devices which serve to modify the shape of the liquid wave front during spreading.

The spread control devices are designed to apply a second compressive force to the central portion of the film unit in the path of the mass of fluid discharged from the pod by the pressure applying members. This serves to selectively reduce or limit the separation or gap between the adjacent layers and retard the central portion of the wave front thereby causing a flow of liquid in a direction transverse to the direction of film advancement. In this manner, the wave front is modified such that it is substantially straight and is oriented in a direction substantially normal to the parallel lateral sides of the rectangular or square image-forming area.

For examples of cameras which are equipped with devices for controlling the distribution of liquid processing composition, reference may be had to U.S. Pat. No. 2,991,703, issued to V. K. Eloranta on July 11, 1961, and U.S. Pat. No. 3,241,468 issued to O. E. Wolff on Mar. 22, 1966, both of which are assigned to the same assignee as the present invention.

In a copending application, Ser. No. 246,701, filed on Apr. 24, 1972, by Alston et al. (now U.S. Pat. No. 3,779,770) and which is assigned to the same assignee as the present invention, there is disclosed a film container having integral spread control members therein.

The spread control members are integrally formed with the interior surface of the leading end of the forward wall of the container which also defines one edge of the film withdrawal slot. After exposure, the forwardmost film unit in the stack is advanced through the slot and into engagement with pressure applying members in the camera. The stack of film units is biased upwardly by a spring in the container so the top surface of the forwardmost film unit is urged into contact with the upper edge (or leading end of the container forward wall) of the withdrawal slot as it is advanced therethrough. By selectively shaping the upper edge of the slot so that it only bears on the central portion of the forwardmost film unit, the upper edge of the slot becomes a spread control member for selectively applying a second compressive force to the film in the path of the advancing wave front of processing fluid.

The major advantage of incorporating the spread control device into the film container is that it may be manufactured to meet the needs of the particular type of film in the container. That is, if the film or pod characteristics vary, the spread control devices may be appropriately modified to compensate for the variation.

The film containers disclosed by Alston et al. are formed of a molded plastic and have thin flexible walls. In order for the spread control devices to operate properly, the film container must be dimensionally stable, especially the forward wall supporting the integrally formed spread control device. Such stability is provided by the camera in which the container is adapted to be used. When the container is inserted into the camera's receiving chamber, the walls of the chamber bear against the walls of the film container and prevent the container walls from bowing or distorting.

While this system is entirely satisfactory from a performance standpoint, it has been found to be expensive in terms of manufacturability.

Experience has shown that a small percentage of the manufactured cameras do not meet the dimensional tolerances required to accurately stabilize the film container. As a result, the spread control devices in the forward wall of the film containers do not function as effectively as they should and some incomplete spreading results.

Rather than tighten the camera tolerances, which is a rather expensive solution to the problem, the present invention provides an improved film container spread control system, the performance of which is significantly less dependent on camera dimensions.

SUMMARY OF THE INVENTION

The present invention provides a photographic film assemblage comprising a film container, a plurality of self-developing film units within the container and means forming an integral part of the container for controlling the distribution of a liquid processing composition between predetermined adjacent layers of such film units.

The film assemblage is characterized by its ability to perform the spread control function with significantly less dependency on the dimensions and/or manufacturing tolerances of the photographic apparatus or camera with which it is adapted to be used than the types of film assemblages described in the aforementioned copending application Ser. No. 246,701 (now U.S. Pat. No. 3,779,770).

In a preferred embodiment, the film container comprises a forward wall having a light-transmission section or exposure aperture therein and an end wall which cooperates with one end of the forward wall to define an elongated film unit withdrawal slot. The forward wall defines the upper edge and the end wall defines the lower edge of the withdrawal slot.

The self-developing film units are arranged in stacked relation within the container with their photosensitive side facing forwardly towards the exposure aperture in the forward wall of the container. The forwardmost film unit in the stack is urged against the interior surface of the forward wall by a spring element at the rear of the stack. With the container supported in an appropriate camera, the forwardmost film unit is exposed and then is advanced, in a direction substantially parallel to the forward wall, through the withdrawal slot at the end of the container and into engagement with pressure applying means mounted in the camera. Advancement of the film unit through the pressure applying means results in the internal distribution of the liquid processing composition as described earlier. The withdrawal slot of the camera supported container is in close proximity to the pressure applying means. This means that when the pod of the forwardmost film unit is ruptured, the major portion of the film unit behind the pod is still in the container.

When the pod is ruptured, the fluid contained therein is discharged in a mass between the predetermined layers at the leading end of the image-forming area and advances along a liquid wave front rearwardly toward the container withdrawal slot and the trailing end of the film unit within the container. As noted earlier, the superposed sheet-like elements which are actually a plurality of layers arranged in superposed relation are bound or held together along their lateral margins to prevent escape of the fluid. As the fluid wave front progresses rearwardly, it causes the opposed sheet-like elements to separate slightly to admit the fluid between the predetermined layers. Because the lateral margins are held together, the two sheets separate more easily in the center of the film unit intermediate the lateral margins thereby causing a concentration of liquid in the center of the film unit.

The distribution control means associated with the film container serves to redistribute the fluid by diverting excess fluid from the center of the film unit outwardly towards both lateral margins.

The distribution control means preferably takes the form of a resilient support member or finger that is disposed to selectively engage the central portion of the underside (the side of the film unit adjacent the lower edge of the film unit withdrawal slot) of the advancing film unit in the vicinity of the container film unit withdrawal slot.

In a preferred embodiment, the resilient finger is integrally formed with the container end wall and extends part way across the slot upwardly from the lower edge towards the upper edge.

As the film unit is advanced through the withdrawal slot, it deflects the finger outwardly to allow the unimpeded passage of the relatively thick pod and thereafter engages the underside of the film unit to urge the central portion of the lower sheet of the film unit upwardly towards the upper sheet. In effect, this creates a constriction in the center of the film unit in the path of the liquid wave front advancing towards the trailing end of the film unit thereby causing some of the liquid to be diverted towards the lateral margins.

As will be explained later in the disclosure, the resilient nature of the spread control finger and its association with the leading end wall of the container rather than the forward wall provides a significant reduction in the dependence of the performance of the spread control means on the dimensions and tolerances of the camera.

Therefore, it is an object of the present invention to provide a photographic film assemblage comprising, a film container, at least one film unit in the container, and means for controlling the distribution of a fluid between a pair of predetermined adjacent layers of the film unit.

It is another object to provide a film assemblage having means associated therewith for controlling the distribution of the fluid processing composition within a film unit and being of such a construction so that the performance of the distribution control means is significantly less dependent on the dimensions and tolerances of the camera with which the assemblage is adapted to be used than other such assemblages.

It is yet another object to provide a photographic film assemblage for use with photographic apparatus of the type including pressure applying means for distributing a fluid processing composition between predetermined layers of a film unit wherein the assemblage includes a container having a withdrawal slot defined by forward and end walls and said assemblage includes fluid distribution control means including a resilient finger which extends part way across a center portion of the slot from the end wall towards the forward wall for engaging a film unit in operative relation with the pressure applying means to cause uniform distribution of the fluid within the film unit.

It is another object of the invention to provide such a film assemblage wherein the spread control means includes resilient means for engaging one layer of a film unit and support means for supporting another layer of the film unit while the resilient means is in engagement with the first layer.

Another object of the invention is to provide a photographic system comprising a photographic apparatus or camera in combination with a photographic film assemblage of the type embodying the instant invention.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 1a is a perspective view of a portion of a film container shown in FIG. 1;

FIG. 5 is an elevational view of a film unit showing the progressive advancement of a liquid wave front, in dotted lines, to illustrate the distribution of liquid processing composition when distribution control members are not utilized in the spread system;

FIG. 6 is an elevational view of a film unit showing progressive advancement of a liquid wave front, in dotted lines, showing the modification of the shape of the wave front caused by the distribution control members; and FIG. 7 is an elevational view of the leading end of a film container, the light shielding elements of FIG. 1 being removed to clearly show the integrally formed fluid distribution control means.

DESCRIPTION OF THE PREFERRED EMBODIMENT

Figure 1:
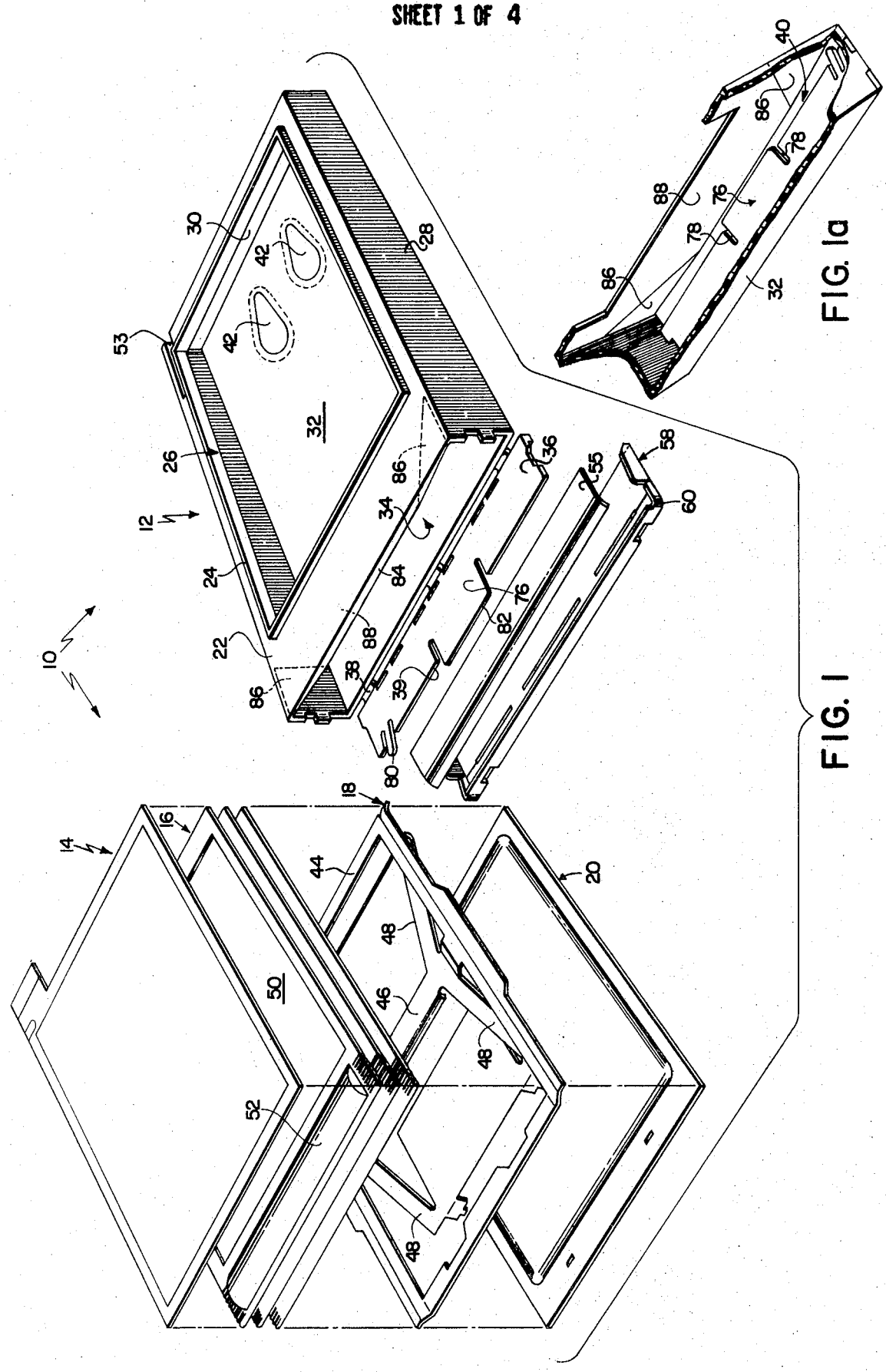
FIG. 1 is an exploded perspective view of a photographic film assemblage embodying the instant invention showing the construction and location of various components of the assemblage.

The components of a photographic film assemblage 10 embodying the instant invention are shown in exploded fashion in FIG. 1 of the drawings. They include a box-like film container 12 and its contents, dark slide 14, a plurality of self-developing film units 16, a film support member 18, and preferably an electrical battery 20.

Film container 12 is preferably molded of an opaque thermoplastic material, such as polystyrene, and includes relatively thin, substantially planar walls. A forward wall 22 includes a generally rectangular upstanding rib 24 which defines the bounds of a generally rectangular light-transmitting section or exposure aperture 26. Depending from three sides of forward wall 22 are a pair of side walls 28 and a trailing end wall 30 which serve to space a substantially planar rear wall 32 from forward wall 22.

The leading ends of forward wall 22, side walls 28, and rear wall 32 cooperated to define an elongated rectangular opening 34 at the leading end of container 12 through which the contents may be inserted. After insertion, a leading end wall 36 which is preferably coupled to the leading end of rear wall 32 by integrally formed flexible hinges 38, may be rotated 90° a5d joined to the leading ends of side walls 28, and rear wall 32 by any suitable method such as ultrasonic welding.

It will be noted that when leading end wall 36 is located in its closed position, its top edge 39 is spaced from the leading end of forward wall 22 such that an elongated withdrawal slot 40 is formed therebetween (see FIG. 7) through which dark slide 14 and film units 16 may be sequentially extracted from container 12.

The contents of film container 12 are preferably arranged therein in the stacked relation shown in FIG. 1. Battery 20 is substantially flat and is positioned over the interior surface of rear wall 32 such that two electrodes on the underside of the battery (not shown) are aligned with a pair of tear-drop shaped openings 42 in rear wall 32. When container 12 is operatively positioned in a suitable camera, a pair of electrical contacts mounted therein are adapted to extend through openings 42 for coupling battery 20 to the camera's electrical system which may include an automatic exposure control circuit, a flash mode circuit, and electrically driven film advance and processing mechanisms.

Positioned between the stack of film units 16 and battery 20 is the film support member 18 which serves to spring bias the film units 16 towards the interior surface of forward wall 22. Preferably, support member 18 includes a rectangular open support frame 44 for engaging the peripheral margins of the rearwardmost film unit in the stack, and a generally H-shaped center section 46 coupled to support frame 44 and including four resilient legs 48 which bear against battery 20 and provide an upward biasing force.

The film units 16 preferably include a rectangular or square photosensitive image-forming area 50, which is surrounded by opaque margins and a rupturable pod 52, containing a liquid processing composition, located at the leading end of the film unit outside of the bounds of the image-forming area 50. A more detailed discussion of the construction of film units 16 will appear hereinafter.

The film units 16 are arranged in stacked relation on top of support frame 44 with their image-forming areas 50 facing towards the exposure aperture 26 in container forward wall 22. Subsequent to the removal of dark slide 14, the forwardmost film unit 16 bears against the interior surface of forward 22 and is in position for exposure to actinic radiation transmitted through exposure aperture 26.

It will be noted that the leading end of the forwardmost film unit 16, containing pod 52, is also aligned with withdrawal slot 40 at the leading end of container 12. Subsequent to exposure, the forwardmost film unit is adapted to be engaged by a film advancing mechanism in the camera and moved out of container 12 through slot 40 for processing. Access for engaging the trailing end of the forwardmost film unit to move it forwardly through slot 40 is provided by an opening 53 located in forward wall 22 and the trailing end wall 30 of container 12.

Dark slide 14 is formed of any suitable opaque material such as cardboard, paper, or plastic and is initially positioned between the forwardmost film unit 16 and the interior surface of forward wall 22. It serves to light seal exposure aperture 26 and opening 53. Once film container 12 is located at its operative position within a camera, it may be removed through withdrawal slot 40 in the same manner as the forwardmost film unit 16.

In order to light seal withdrawal slot 40, container 12 is preferably provided with an opaque flexible sheet 55 which is secured at one end to an exterior surface of leading end wall 36 and is disposed in closing relation to slot 40. This sheet forms a primary light seal for blocking light when container 12 is located within a camera. A secondary light shield for blocking slot 40 prior to inserting container 12 into the camera may also be provided in the form of an end cap member 58. Member 58 is coupled to leading end wall 36 and includes an end cap 60 which is initially positioned in closing relation to the primary light seal 55 and withdrawal slot 40 and may be pivoted to an open position in response to inserting container 12 into the camera. For details as to the construction and operation of end cap member 58, reference may be had to the copending application of Nicholas Gold, Ser. No. 213,989, filed on Dec. 30, 1971 (now U.S. Pat. No. 3,748,984), which is also assigned to the same assignee as the present invention.

Figure 2:
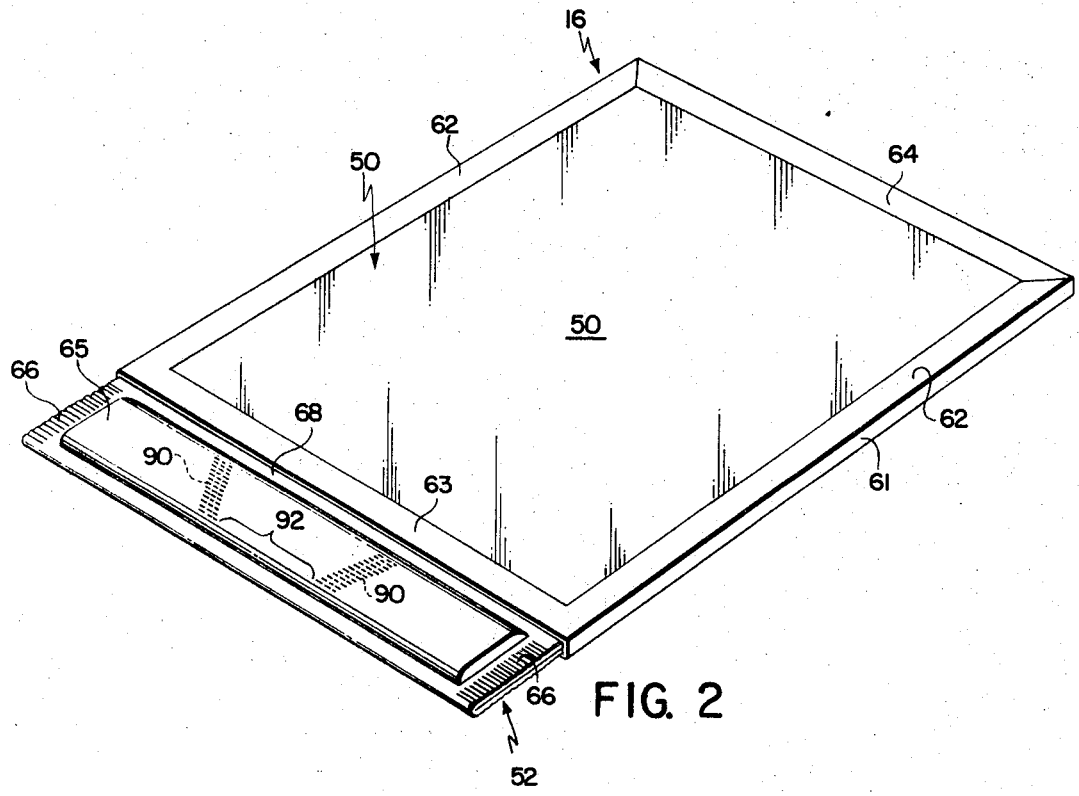
FIG. 2 is a perspective view of a self-developing film unit.
Figure 3:
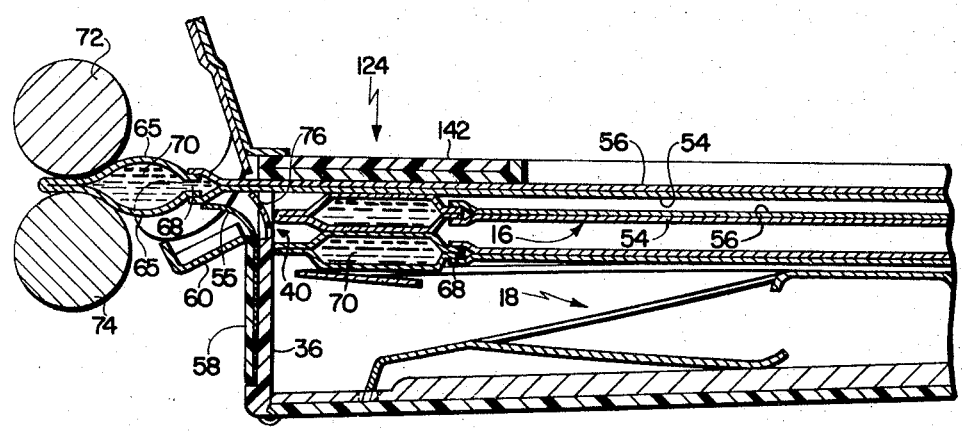
FIG. 3 is an enlarged elevational view, in section, of a portion of the film assemblage and a camera showing a film unit in operative association with a pair of pressure applying rollers mounted in the camera and distribution control means located in the film container.

Referring now to FIGS. 2 and 3 of the drawings, a typical self-developing film unit 16 comprises a laminate represented by opposed or superposed sheet-like elements 54 and 56.

As disclosed in U.S. Pat. No. 3,415,644, issued to Edwin H. Land on Dec. 10, 1968, the film unit 16 actually includes an opaque bottom outer support layer, a transparent top outer support layer and a plurality of superposed layers of photographic materials, including one or more photosensitive and one of more image-receiving layers, sandwiched between the two outer layers. The photosensitive layer or layers are adapted to be exposed by light transmitted through the transparent outer layer after which the processing fluid is distributed between a pair of predetermined adjacent layers to initiate a diffusion transfer process.

This laminate has been diagrammatically illustrated as including a top sheet-like element 56 (comprising a transparent outer sheet or layer and certain chemical layers) and a bottom sheet-like element 54 (comprising an opaque bottom outer sheet or layer and certain other chemical layers). It will be understood that the interface between elements 54 and 56 represents an interface between a pair of predetermined layers within the laminate. The term layer will apply equally to an outer sheet and the chemical layers between the outer sheets.

The laminate's structural integrity may also be enhanced or provided, in whole or in part, by providing a binding member 61 which extends around the edges of the laminate. The binding member 61 may take the form of an opaque, pressure-sensitive adhesive tape which also serves to provide lateral margins 62, and leading and trailing end longitudinal margins 63 and 64 bordering the photosensitive image-forming area 50.

The rupturable pod 52 preferably comprises a rectangular blank of fluid and air impervious sheet material folded longitudinally upon itself to form two walls 65 which are sealed to one another along their lateral end margins 66 and longitudinal margin 68 to form a cavity in which a fluid or liquid processing composition 70 is retained. The longitudinal seal 68 is made weaker than the lateral end seals 66 so as to become unsealed in response to hydraulic pressure generated within the liquid 70 by the application of compressive pressure to the walls 65 of the pod 52.

As best shown in FIG. 3, pod 52 is fixedly secured to the leading ends of the superposed sheet-like elements 54 and 56 such that the weaker longitudinal seal 68 is positioned to effect a unidirectional discharge of the fluid 70 between the predetermined pair of layers represented by the interface between sheet-like elements 54 and 56 upon application of compressive pressure to pod 52.

Accordingly, film unit 16 comprises a plurality of layers including photosensitive and image-receiving layers and layers (outer sheets) which define first and second exterior surfaces of the film unit. It also includes a container of fluid processing composition at one end of the film unit which is adapted to be distributed between a predetermined pair of such layers.

In use, film unit 16 is subjected to actinic radiation which is directed through the transparent outer sheet of element 56 to photo-expose and form latent images in the underlying photosensitive layer or layers. The film unit then may be advanced, pod 52 first, between a pair of juxtaposed cylindrical rollers 72 and 74 (see FIG. 3) which apply a compressive pressure to the walls 65 of pod 52 and induce a hydraulic pressure in fluid 70 thereby causing seal 68 to rupture. The fluid 70 is discharged, in a mass, between elements 54 and 56, at leading end margin 63, and is spread between and in contact therewith in a thin layer towards margin 64 by rollers 72 and 74, as film unit 16 is further advanced between the rollers, thereby covering the photoexposed area 50 with the liquid processing composition 70. Processing composition 70 initiates a diffusion transfer process which results in a positive print being formed which may be viewed through the outer transparent sheet of element 56.

As noted earlier, it is desirable that the layer of processing composition between elements 54 and 56 be of uniform thickness over the entire image-forming area 50 to obtain an optimum quality positive print. It was also noted that the uniformity of the liquid layer is influenced by the initial shape of the wave front of the mass of liquid as it is discharged from pod 52.

Different types of film units tend to have different initial wave front shapes due to variances in their pod design, pod seal rupture characteristics, the amount and viscosity of the liquid processing composition enclosed by the pod, and the resistance to fluid flow at the interface between the fluid and the superposed elements forming the laminate.

A commonly observed wave front is illustrated in dotted lines in FIG. 5. It is tongue or bow-shaped, i.e., the liquid 70 initially tends to move towards the trailing end of the film unit more rapidly at the central portion of the photo-exposed image-forming area 50 than out at lateral margins 62 thereof. This condition can generally be attributed to the fact that the superposed sheet-like elements 54 and 56 are held together at their lateral margins 62 by the binding element 61 while the unrestrained medial or center portions of elements 54 and 56 are free to separate slightly in response to the rearward discharge of fluid 70 between the elements. The slight difference in spacing between the lateral edges and the medial portions of elements 54 and 56 is sufficient to cause a reduction in fluid flow resistance in the middle of the image-forming area 50.

As the film unit 16 is advanced, the rollers 72 and 74 progressively spread the fluid 70 (as shown in dotted lines in FIG. 5) towards the trailing end margin 64 which may include an integrally formed reservoir or trap for collecting and retaining excess fluid. Because there is an uneven lateral distribution of fluid, the depth or thickness of the layer may be reduced near the corners of the image-forming area 50 at the trailing end of film unit 16. In some instances, the trailing end corners may not be covered at all.

In order to control the distribution of fluid 70 as it is spread by a pair of pressure applying members mounted within a camera, film assemblage 10 is provided with a distribution control device. Preferably spread control is achieved by providing means associated with the film container for selectively engaging the underside (element 54) of a forwardmost film unit in operative relationship with the pressure applying means of an apparatus or camera to urge the medial portion of the lower element 54 towards the upper element 56. In effect, this limits the allowable separation of elements 54 and 56 in the center of the film unit and thereby selectively increases the center resistance to fluid flow. As the fluid 70 flows rearwardly between elements 54 and 56, the increased flow resistance selectively retards the center of the liquid wave front and causes a flow of fluid outwardly towards the lateral margins 62 of the image-forming area 50 thereby resulting in a more even lateral distribution of fluid (see FIG. 6).

In a preferred embodiment, the spread control device includes a resilient, centrally disposed finger 76, integrally formed with container leading end wall 36. As best shown in FIGS. 1, 3 and 7, finger 76 extends upwardly from leading end wall 36 and part way across film withdrawal slot 40 towards forward wall 22.

Spread control finger 76 is preferably formed of the same thermoplastic material as end wall 36 but it is thinner than the major portion of wall 36 to make it relatively resilient. For example, the nominal thickness of wall 36 is 0.025 inch whereas finger 76 measures .007 to .009 inch. The resiliency of finger 76 is enhanced by providing a pair of vertical slots 78 adjacent the lateral edges of the finger.

In the illustrated embodiment, leading end wall 36 is provided with a second integrally formed resilient finger 80, near one lateral edge, which extends part way across film withdrawal slot 40. Finger 80 is a film hold back to insure that only the forwardmost film unit 16 in the stack may be advanced through slot 40. It does not form any part of the spread control device and is not necessary for the proper operation of the instant invention. In some instances, spread control finger 76 may also perform the hold back function.

Figure 4:
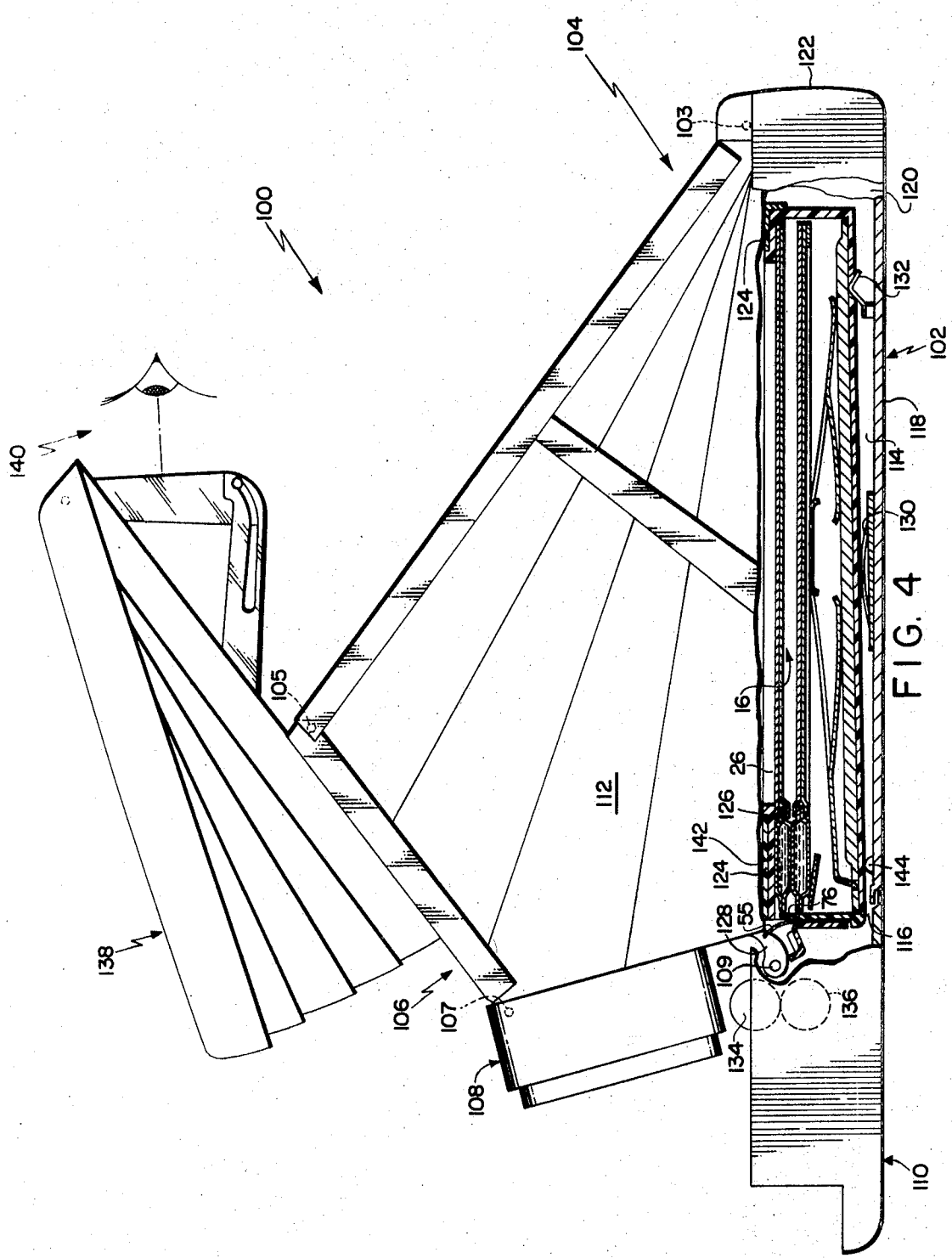
FIG. 4 is an elevational view, partly in section, of a camera having a film assemblage located at an operative position therein.

As best shown in FIGS. 3 and 4, the film container 12 is adapted to be positioned in a suitable camera so that film withdrawal slot 40 is closely adjacent rollers 72 and 74 and is in alignment with the bite between the rollers. Subsequent to removal of dark slide 14, the forwardmost film unit 16 is exposed through container aperture 26 and is then advanced to the left through slot 40 and into engagement with rollers 72 and 74.

As the pod 52 advances to the left, it deflects spread control finger 76, finger 80, and the flexible light seal 55 out of its path of travel. End cap 60 is already in an open position and is held out of the film unit path of travel by appropriate structure in the camera. When fully deflected (to the left), finger 76 exerts a small compressive pressure on pod 52 but it is not sufficient to cause the longitudinal seal 68 to rupture.

As the pod 52 advances between the rollers 72 and 74, finger 76 returns just slightly to the right, frictionally engages the center or medial portion of the exterior surface of lower sheet-like element 54 and urges it upwardly towards the overlying sheet-like element 56. With the medial portion of element 54 so supported by spread control finger 76, the allowable separation or gap between elements 54 and 56 is limited. Upon discharge of the fluid 70 from pod 52, the center of the wave front is selectively retarded thereby promoting fluid flow towards the lateral margins 62 of the film unit 16. As best shown in FIG. 6, the wave front is substantially straight and substantially normal to direction of film advancement through the rollers 72 and 74.

It must be stressed at this point that the illustrated spread control finger 76 may have to be modified to suit the particular type of film unit being housed in container 12.

As noted earlier, different types of film units will vary in terms of: stiffness; pod rupture characteristics; the viscosity of the fluid in pod 52; the desired thickness of the layer of fluid to be distributed between elements 54 and 56; the velocity at which the film unit will be advanced through the rollers 72 and 74; and other variables.

Depending on the particular type of film unit and the characteristics of the camera with which it will be used, the spread control finger 76 may be modified in terms of: stiffness and resiliency; the spacing between the top edge 82 of finger 76 and the upper edge 84 of the withdrawal slot; the width or lateral dimensions of the finger 76 in relation to the width of a film unit; and the placement of the finger 76 with respect to the longitudinal center line of the film unit.

In some instances the lower sheet-like element 54 may be relatively flexible when compared to the flexibility of the upper element 56. In this case finger 76 alone will probably be sufficient to control the central separation of elements 54 and 56. In other instances where both elements may be relatively flexible, the medial portion of the upper element 56 may have to be supported while finger 76 urges the center of lower element 54 upwardly towards the center of element 56. In that case, the upper edge 84 of film withdrawal slot, or the leading end of forward wall 22, will serve as a support means.

As best shown in FIG. 3, the spring element 18 in the container urges the stack of film units 16 upwardly towards the interior surface of container forward wall 22. Thus the exterior surface of upper film element 56 bears against and is supported by the forward wall of the film container. As the film unit 16 is withdrawn through slot 40, the upper edge 84 of slot 40 is in frictional engagement with the exterior surface 56 and the resilient spread control finger 76 is in frictional engagement with the exterior surface of the center of lower film element 54. Together upper slot edge 84 and resilient finger 76 cooperate to apply a compressive pressure to the center part of the film unit.

With rollers 72 and 74 applying a first compressive force behind the mass of fluid 70, and upper edge 84 and resilient finger 76 applying a second compressive force to the central portion of the fluid flow path in front of the mass of fluid a portion of the concentration of fluid 70 at the center of the film unit seeks the path of least resistance and tends to flow transversely of the direction of film advancement towards the lateral margins 62 of the film unit 16. Thus the distribution of fluid between the lateral margins 62 becomes more uniform and the shape of the wave front 76 is modified such that it is substantially straight and normal to margins 62 as shown in FIG. 6.

In some applications it may be desirable to selectively support only the center portion of the upper sheet-like element 56 while resilient finger 76 frictionally engages the center of element 54. As best shown in FIG. 1a, this may be accomplished by providing a pair of laterally spaced tapered recesses 86 in the interior surface of container forward wall 22 adjacent film withdrawal slot 40. Thus only the center portion 88 (between recesses 86) of the interior surface of forward wall 22 will bear against the exterior surface of element 56 and thereby support the medial portion of upper element 56 while resilient finger 76 frictionally engages the center of lower sheet-like element 54. As more fully disclosed in copending application, Ser. No. 246,701 (now U.S. Pat. No. 3,779,770), alternative structure may be provided at the leading end of forward wall 22 for selectively supporting the medial portion of upper element 56. Instead of providing a pair of laterally spaced recesses 86, the support means may take the form of one or more integrally formed projections depending from the interior surface of container forward wall 22 in the vicinity of withdrawal slot 40 over the medial portion of the forwardmost film unit 16.

Returning for a moment to the characteristics of resilient spread control finger 76, it was noted that the lateral dimension of the finger will bear some relationship to the width of the film unit 16. Again it must be stressed that this relationship will vary with different types of film units.

In order to provide one example of this relationship, assume for the moment that pod 50 is divided into three equivolume compartments by angled seals 90. As more fully disclosed in copending application, Ser. No. 300,709, the outer two compartments are trapezoidal in shape. It has been found that performance of resilient finger 76 is optimized by locating it on leading end wall 36 so that it engages element 54 directly in front of the center compartment of pod 52. The lateral dimension of finger 76 preferably approximates the smallest lateral dimension 92 intermediate angled seals 90. If spread control finger 76 is wider than that dimension, it tends to inhibit the discharge of all of the fluid from the two outer pod compartments. If it is narrower, its efficiency in directing fluid 70 towards lateral margins 62 is somewhat impaired. Again this relationship or ratio of finger width to film width may change if the viscosity of the fluid 70 or any other parameter is altered.

As noted earlier, film assemblage 10 is adapted to be inserted into an appropriate photographic apparatus for sequentially exposing and processing the film units 16 located within film container 12. Such an apparatus may take the form of a compact, folding, single lens reflex camera 100 shown in FIG. 4 in its extended and operative position.

Camera 100 includes four housing sections 102, 104, 106, and 108, pivotally connected at pivots 103, 105, 107, and 109 for movement between a compact folded position and the extended operative position of FIG. 4, and a fifth housing section 110 pivotally coupled to and extending forwardly (to the left as viewed in FIG. 4) of housing section 102. Enclosing the space between the extended housing sections 102, 104, 106, and 108 to form the camera's exposure chamber is a foldable opaque bellows or envelope 112.

Housing section 102 is a generally parallelepiped shaped structure which includes an open-ended chamber 114 therein for receiving the film assemblage 10. The open end 116 of chamber 114, through which film container 12 is adapted to be inserted, is located near the interface between housing sections 102 and 110. Access to opening 116 is provided by pivoting housing section 110 in a counterclockwise direction (as viewed in FIG. 4) relative to housing section 102.

Chamber 114 is formed by a rear or bottom wall 118, a pair of inner frame side walls 120 (only one of which is shown), a trailing end wall 122, and a top or forward wall 124. Chamber wall 124 is essentially a plate-like structure having a generally rectangular opening 126 therein with which the exposure aperture 26 of film container 12 is adapted to be aligned.

With housing section 110 located in the open position, film container 12 is inserted through opening 116, trailing end first, and is moved rearwardly (to the right as viewed in FIG. 4) into chamber 114. It will be noted that camera 100 includes a pair of brackets 128 (only one of which is shown) located near opening 116 for pivotally coupling housing section 108 to housing section 102. Brackets 128 are located adjacent the path of travel of the film container side walls 28 and engage portions of the end cap extending outwardly beyond the side walls of film container 12 and pivot the end cap 60 from the closed to the open position such that it is out of alignment with withdrawal slot 40.

Film container 12 is supported at its operative position within chamber 114 by plate 124 which bears against the exterior surface of forward wall 22, inner side walls 120 which bear against container side walls 28, and a spring support member 130, mounted on the interior surface of chamber rear wall 118, which bears against rear wall 32 of the film container 12.

When film container 12 is located at its operative position, the exposure aperture 26 in the forward wall 22 of film container 12 is aligned with aperture 126 in plate 124. Plate 124 serves to position container 12 such that the forwardmost film unit 16 is located at the camera's exposure plane (subsequent to removal of dark slide 14). A pair of electrical contacts 132 (only one of which is shown) extend through openings 42 in the rear wall 32 of the container 12 and make electrical contact to the electrodes on the underside of battery 20. Also, a film advancing mechanism (not shown) mounted in housing section 102 extends through opening 53 in the forward and trailing end walls of the film container 12 for engaging and advancing the forwardmost film unit 16 through withdrawal slot 40.

After film container 12 has been located at its operative position within chamber 114, housing section 110 is pivoted to its closed position thereby locating a pair of pressure applying members 134 and 136, mounted thereon, in operative relation with the film container withdrawal slot 40. Pressure applying members 134 and 136 preferably take the form of a pair of rotatably mounted, cylindrical, juxtaposed rollers having their axes of rotation substantially parallel to the leading end wall 36 of a film container located in chamber 114 such that the bite between the rollers is in a plane which includes withdrawal slot 40 and the camera's exposure plane.

The forwardmost film unit 16 is adapted to be exposed by image-bearing light transmitted through the aperture 126 in plate 124 and the exposure aperture 26 in the forward wall 22 of film container 12.

Camera 100, being of the single lens reflex type, is adapted to operate first in a viewing and focusing mode and then in an exposure and processing mode.

The camera's optical system includes an objective lens mounted in housing section 108; a planar mirror mounted on the interior surface of housing section 104; a plate-like reflex member pivotally mounted in housing section 102 at pivot 103 for movement between a viewing and focusing position in which the reflex member rests atop plate 124 in covering relation to aperture 126 and an exposure position in which it is positioned parallel with and adjacent to the planar mirror mounted on housing section 104; and a reflex type viewing device 138 mounted on housing section 106. The plate-like reflex member includes a reflective focusing screen on its top side facing housing sections 104 and 106 and a planar mirror on its underside facing receiving chamber 114.

During the viewing and focusing mode of operation, light from the objective lens is directed toward the mirror mounted on housing section 104 which reflects it downwardly onto the focusing screen covering aperture 126 to form an image of the scene to be photographed. Light emanating from the image on the focusing screen is directed back to the mirror mounted on housing section 104 which reflects it into the viewing device 138. A second image of the scene is formed by the viewing device 138 which may be viewed from an eye station designated 140.

After adjusting the objective lens such that the image of the scene is in sharp focus, the user actuates a button mounted on housing section 108 to initiate the exposure and processing mode of operation. A shutter behind the objective lens closes and an entrance pupil for the viewing device 138 is blocked to render the chamber, formed by the bellows 96, lighttight. The reflex member is pivoted upwardly such that the planar mirror on the underside faces the objective lens. The shutter is opened and light therefrom is reflected by the mirror on the underside of the reflex member through apertures 126 and 26 to cause exposure of the forwardmost film unit 16 through its transparent image-receiving element 56. After an appropriate exposure interval, the shutter is closed and the reflex member is returned to its viewing position. The shutter is then opened and the viewing device entrance pupil is unblocked.

As the reflex member is being returned to the viewing position, the film advance mechanism engages the exposed forwardmost film unit 16 and moves it through the withdrawal slot 40 into the bite of rollers 134 and 136. At least one of the rollers is driven in a direction to cause the film unit 16 to be advanced therebetween towards the exterior of the camera 100 (to the left as viewed in FIG. 4).

For a more detailed description of the camera's optical system and modes of operation, reference may be had to the copending application of Peter F. Costa and Edward H. Coughlan, Ser. No. 141,554, filed on May 10, 1971 (now U.S. Pat. No. 3,722,389), and assigned to the same assignee as the present invention.

As the pod 52 of the forwardmost film unit 16 advances through withdrawal slot 40, it deflects spread control finger 76, hold back finger 80 and flexible light seal 55 and enters the bite of rollers 134 and 136. With spread control finger 76 frictionally engaging the medial portion of sheet-like element 54, the space of the liquid wave front is modified to promote uniform lateral fluid distribution as disclosed in detail earlier.

The molded plastic walls of film container 12 are relatively thin and therefore flexible. In order to maintain container in a dimensionally stable state, e.g., to maintain the height of slot 40 between the lower edge defined by edge 39 of lead end wall 36 and the upper edge defined by edge 84 of forward wall 22, the container must be properly supported within camera 100. This is especially true of the leading end section of forward wall 22 between leading edge 84 and the leading end of exposure aperture 26. When improperly supported this section may tend to bow upwardly creating a small space between the interior surface of forward wall 22 and the top surface of the forwardmost film unit 16.

As best shown in FIGS. 3 and 4, the film container 12 is supported by structure defining the camera's film container receiving chamber 114. For example, the leading end of container forward wall 22 bears against and is supported or restrained by the leading end 142 of plate 124 to prevent upward bowing of the flexible container section. The inner frame side walls 120 bear against container side walls 28 to provide lateral support for the leading end of container 12. The rigidity of the container is also enhanced by a support surface 144 which may be integrally formed with the bottom wall 118 of chamber 114 so that it bears against the leading end of container rear wall 32.

In the previously mentioned copending application, Ser. No. 246,701 (now U.S. Pat. No. 3,779,770), the disclosed fluid spread control devices are integrally formed with the interior surface of the flexible container forward wall 22 near or at the upper edge 84 of the film withdrawal slot. In operation they bear against or frictionally engage the medial portion of the exterior surface of the upper sheet-like element 56 being advanced through slot 40. In cooperation with spring support member 18 they serve to selectively apply a compressive pressure in the path of the rearwardly advancing liquid wave front to cause a transverse flow of fluid towards the lateral margins 62.

In that embodiment, positioning of the spread control devices relative to the top surface of the forwardmost film unit is critical. Because the spread control devices are integrally formed with the flexible forward wall, the dimensions of the supporting surfaces in the camera's film receiving chamber are critical. This is especially true of the leading end 142 of plate 124 which supports or restrains the leading end of forward wall 22. In order to initially locate and thereafter maintain the spread control member in optimum operative relationship with forwardmost film unit, leading end 142 must be accurately located with respect to the bite of the rollers and all of the other surfaces which bear against the film container 12. Other characteristics such as the flatness of the leading end 142, its stiffness and surface finish also must be controlled.

On the other hand, the performance of the spread control system associated with container 12 of the instant invention is significantly less dependent on the dimensions of the camera. For example, the vertically disposed container end wall 36 is less susceptible to deflection in a direction transverse to the plane of film unit travel through slot 40 than is the horizontally disposed forward wall 22. This is because the thin dimension of leading end wall 36 is transverse to the plane of travel while the thin dimension of forward wall 22 is substantially parallel to the plane. It follows then that the flexible finger 76 supported by the leading end wall is less susceptible to being displaced from its optimum operative relationship with the forwardmost film unit when the film container is supported in chamber 114 than are spread control devices integrally formed with forward wall 22.

In the illustrated embodiment, the upper edge 84 of withdrawal slot 40 or the leading end of forward wall 22 merely serves to support the upper film element 56 while the resilient spread control frictionally engages the medial portion of the lower element 54. The location, dimensions and shape of the leading end 142 of plate 124 are significantly less critical because of the resilient nature of finger 76. That is to say, the resiliency of finger 76 will maintain the finger 76 in contact with the lower film unit element 54 even if there is a slight deviation from the optimum location of the leading end of forward wall 22 due to a dimensional error in leading end 142 of plate 124.

The illustrated film assemblage includes film units 16 of the type wherein the sheet-like elements or the plurality of layers are in superposed relationship prior to exposure. It is to be understood that it is within the scope of the present invention to utilize the disclosed spread control system with photographic film assemblage of the type which include film units of the type wherein element 56 (some of the plurality of layers) is adapted to be brought into superposition with element 54 (other of the plurality of layers) after exposure and before the superposed elements 54 and 56 are advanced through film withdrawal slot 40. Examples of such film units may be found in U.S. Pat. Nos. 3,079,849 and 3,080,805, both of which are assigned to the same assignee as the present invention.

While the spread control finger 76 has been shown to be integrally molded with leading end wall 36, it is within the scope of the invention to provide a separate finger which may be coupled to wall 36. For example, a thin resilient finger may be sandwiched between end wall 36 and the overlying light shielding element 58 such that it extends part way across slot 40.

Also, while the resilient finger 76 has been shown to engage film sheet-like element 54, alternatively, it is within the scope of the present invention to provide a resilient finger 76 associated with forward wall 22 for engaging the medial portion of the upper film element 56 to provide the spread control function.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. Photographic film assemblage for use with photographic apparatus of the type including pressure-applying means for distributing a fluid processing composition within a film unit that is advanced relative to the pressure-applying means, said film assemblage comprising:

a film container for holding at least one film unit, said film container having a withdrawal slot therein through which a film unit held in said film container is adapted to be advanced to bring it into operative relationship with the pressure-applying means of the apparatus;

at least one film unit in said film container, said one film unit comprising a plurality of layers, including photosensitive and image-receiving layers, each having lateral edges, and a container of fluid processing composition at one end of said one film unit, said one film unit being adapted to be advanced, container of fluid first, relative to the pressure-applying means of the apparatus with said plurality of layers in superposed relation for distributing said fluid between a predetermined pair of said layers and thereby causing said predetermined pair of layers to separate; and means on said film container so as to form an integral part of said film assemblage for controlling the distribution of said fluid between said predetermined pair of layers, said distribution control means including resilient means deflectable in the direction of film advancement for engaging said one film unit and limiting the separation of said predetermined layers caused by the introduction of said fluid therebetween, thereby directing a portion of said fluid towards said lateral edges of said predetermined pair of layers.

2. Photographic film assemblage as defined in claim 1 wherein said resilient means includes means for engaging a medial portion of one of said plurality of layers intermediate its said lateral edges.

3. Photographic film assemblage as defined in claim 2 wherein said means for engaging a medial portion of said one layer extends part way across said withdrawal slot of said film container.

4. Photographic film assemblage as defined in claim 1 wherein said one film unit is adapted to be exposed prior to advancement relative to the pressure-applying means of the apparatus and said plurality of layers are adapted to be in superposed relation during exposure.

5. Photographic film assemblage as defined in claim 4 wherein said plurality of layers form a laminate.

6. Photographic film assemblage as defined in claim 1 wherein said one film unit is adapted to be exposed prior to advancement relative to the pressure-applying means of the apparatus and certain of said plurality of layers are adapted to be brought into superposition with other of said plurality of layers subsequent to exposure but prior to advancement relative to the pressure-applying means of the apparatus.

7. Photographic film assemblage as defined in claim 1 wherein said one layer is transparent.

8. Photographic film assemblage as defined in claim 1 wherein said one layer is opaque.

9. Photographic film assemblage as defined in claim 1 wherein said distribution control means further includes support means for supporting said one film unit while said resilient means limits the separation of said predetermined pair of layers.

10. Photographic film assemblage for use with photographic apparatus of the type including pressure-applying means for distributing a fluid processing composition within a film unit that is advanced relative to the pressure-applying means, said film assemblage comprising:

a film container for holding at least one film unit, said film container having a forward wall and an end wall defining a withdrawal slot at one end of said film container through which a film unit held in said film container is adapted to be advanced to bring it into operative relationship with the pressure-applying means of the apparatus;

at least one film unit in said film container, said one film unit comprising a plurality of layers, including photosensitive and image-receiving layers, each having lateral edges, and a container of fluid processing composition at one end of said film unit, said one film unit being adapted to be advanced, container of fluid first, relative to the pressure-applying means of the apparatus with said plurality of layers in superposition for distributing said fluid between a predetermined pair of said plurality of layers; and means on said film container so as to form an integral part of said film assemblage for controlling the distribution of said fluid between said predetermined pair of layers, said distribution control means including resilient means integrally formed with said end wall of said film container for selectively engaging a medial portion of one of said layers intermediate said lateral edges to direct at least a portion of said fluid being distributed by the pressure-applying means of the apparatus towards said lateral edges of said predetermined pair of layers, said resilient means being initially positioned in the path of advancement of said film unit through said withdrawal slot and being deflectable by said film unit to allow said container of fluid to advance past said resilient means without said fluid being discharged therefrom and thereafter moving towards said initial position to engage said medial portion of one of said layers to effect the controlled distribution of said fluid.

11. Photographic film assemblage as defined in claim 10 wherein said one layer defines an exterior surface of said one film unit and is transparent.

12. Photographic film assemblage as defined in claim 10 wherein said one layer defines an exterior surface of said one film unit and is opaque.

13. Photographic film assemblage as defined in claim 10 wherein said one film unit is adapted to be exposed prior to advancement relative to the pressure-applying means of the apparatus and said plurality of layers are adapted to be in superposition during exposure.

14. Photographic film assemblage as defined in claim 13 wherein said plurality of layers form a laminate.

15. Photographic film assemblage as defined in claim 10 wherein said one film unit is adapted to be exposed prior to advancement relative to the pressure-applying means of the apparatus and certain of said plurality of layers are adapted to be brought into superposition with other of said plurality of layers subsequent to exposure but prior to advancement relative to the pressure-applying means of the apparatus.

16. Photographic film assemblage as defined in claim 10 wherein said film container includes a forward wall defining an upper edge of said withdrawal slot and an end wall defining an opposed lower edge of said withdrawal slot, said one film unit being positionable in said film container so that it may be advanced through said slot with said one layer adjacent said lower edge and said resilient means being located in position to engage said medial portion of said one layer.

17. Photographic film assemblage as defined in claim 10 further including support means for supporting said one film unit while said resilient means engages said medial portion of said one layer.

18. Photographic film assemblage as defined in claim 17 wherein said one layer defines a first exterior surface of said one film unit and another of said plurality of layers defines a second exterior surface of said one film unit and said support means is adapted to engage said second exterior surface while said resilient means engages said first exterior surface.

19. Photographic film assemblage as defined in claim 17 wherein the pressure-applying means of the apparatus is adapted to apply a first compressive pressure to said one film unit for distributing said fluid between said predetermined pair of layers and said resilient means and said support means cooperate to selectively apply a second compressive pressure to said medial portion of said one film unit in the path of said fluid to direct a portion of said fluid towards said lateral edges.

20. Photographic film assemblage as defined in claim 10 including a plurality of said film unit arranged in stacked relation within said film container.

21. A photographic system comprising:
photographic apparatus including:
a housing;
means associated with said housing for receiving and supporting a film container holding at least one film unit; and
pressure-applying means for distributing a fluid processing composition within a film unit that is advanced relative to the pressure-applying means;
in combination with a photographic film assemblage including:
a film container for holding at least one film unit, said film container having a withdrawal slot therein through which a film unit held in said film container is adapted to be advanced to bring it in operative relationship with said pressure-applying means of said apparatus;
at least one film unit in said film container, said one film unit comprising a plurality of layers, including photosensitive and image-receiving layers, each having lateral edges, and a container of fluid processing composition at one end of said one film unit, said one film unit being adapted to be advanced, container of fluid first, relative to said pressure-applying means of said apparatus with said plurality of layers in superposed relation for distributing said fluid between a predetermined pair of said layers and thereby causing said predetermined pair of layers to separate; and means on said film container for controlling the distribution of said fluid between said predetermined pair of layers, said distribution control means including resilient means integrally formed with said film container and being deflectable in the direction of film advancement for limiting the separation of said predetermined pair of layers caused by the introduction of said fluid therebetween and thereby directing a portion of said fluid towards said lateral edges of said predetermined pair of layers.

22. Photographic film assemblage for use with photographic apparatus of the type including elongated pressure-applying means, said film assemblage comprising:

at least one film unit comprising a plurality of layers, including photosensitive and image-receiving layers, and a container of fluid processing composition, said container of fluid processing composition being arranged to release its said fluid processing composition between selected layers of said film unit as said film unit is progressively advanced into operative relationship with said pressure-applying means, said pressure-applying means serving to subsequently progressively distribute said composition between said selected layers as said selected layers are then progressively advanced into operative relationship therewith; and
a film container in which said film unit is initially retained, said film container having an elongated withdrawal slot through which said film unit may be advanced from said container towards said pressure-applying means and including means for exerting a compressive force on a medial transverse section of said film unit as said fluid processing composition is being distributed between said selected layers to control the distribution of said fluid processing composition between said selected layers, said compressive force exerting means including a member extending into the path of advancement of said film unit to engage said film unit as it is advanced from said film container and structured to be deflected by the portion of said film unit containing said fluid processing composition container to permit said fluid processing container to traverse said flexible member as it is advanced towards said pressure-applying means without said member causing a release of the fluid processing composition therefrom and to return towards its initial position after said fluid processing composition container has advanced therepast to exert a compressive force on said film unit downstream from said fluid processing composition container.

23. Photographic film assemblage as defined in claim 22 wherein said member is resilient.

24. Photographic film assemblage for use with photographic apparatus of the type including pressure-applying means for distributing a fluid processing composition within a film unit that is advanced relative to the pressure-applying means, said film assemblage comprising:
a film container for holding at least one film unit, said film container having forward and end walls defining upper and lower edges, respectively, of a withdrawal slot in said film container through which a film unit held in said film container is adapted to be advanced to bring it into operative relationship with the pressure-applying means of the apparatus;

at least one film unit in said film container, said one film unit comprising a plurality of layers, including photosensitive and image-receiving layers, each having lateral edges, and a container of fluid processing composition at one end of said one film unit, said one film unit being adapted to be advanced, container of fluid first, relative to the pressure-applying means of the apparatus with said plurality of layers in superposed relation for distributing said fluid between a predetermined pair of said layers and thereby causing said predetermined pair of layers to separate; and
means associated with said film container for controlling the distribution of said fluid between said predetermined pair of layers, said distribution control means including resilient means for limiting the separation of said predetermined layers caused by the introduction of said fluid therebetween and thereby directing a portion of said fluid towards said lateral edges of said predetermined pair of layers, said resilient means including means for engaging a medial portion of one of said plurality of layers of said film unit intermediate said lateral edges of said one layer, said engaging means being disposed on said film container to extend upwardly from said lower edge and part way across said withdrawal slot towards said upper edge of said withdrawal slot.

25. Photographic film assemblage for use with photographic apparatus of the type including pressure-applying means for distributing a fluid processing composition within a film unit that is advanced relative to the pressure applying means, said film assemblage comprising:

a film container for holding at least one film unit, said film container having a withdrawal slot therein through which a film unit held in said film container is adapted to be advanced to bring it into operative relationship with the pressure-applying means of the apparatus, said film container including a forward wall defining an upper edge of said withdrawal slot and an end wall defining an opposed lower edge of said withdrawal slot;

at least one film unit in said film container, said one film unit comprising a plurality of layers, including photosensitive and image-receiving layers, each having lateral edges, and a container of fluid processing composition at one end of said film unit, said one film unit being adapted to be advanced, container of fluid first, relative to the pressure-applying means of the apparatus with said plurality of layers in superposition for distributing said fluid between a predetermined pair of said plurality of layers, said one film unit being positionable in said film container so that it may be advanced through said withdrawal slot with said one layer adjacent said lower edge thereof; and means associated with said film container for controlling the distribution of said fluid between said predetermined pair of layers, said distribution control means including resilient means for selectively engaging a medial portion of one of said layers intermediate said lateral edges to direct at least a portion of said fluid being distributed by the pressure-applying means of the apparatus towards said lateral edges of said predetermined pair of layers, said resilient means being in position to extend part way across said withdrawal slot upwardly from said lower edge towards said upper for engaging said medial portion of said one layer.

26. Photographic film assemblage as defined in claim 25 wherein said resilient means is integrally formed with said end wall.

27. Photographic film assemblage for use with photographic apparatus of the type including pressure-applying means for distributing a fluid processing composition within a film unit that is advanced relative to the pressure-applying means, said film assemblage comprising:

a film container for holding at least one film unit, said film container having a withdrawal slot therein through which a film unit held in said film container is adapted to be advanced to bring it into operative relationship with the pressure-applying means of the apparatus, said film container including a forward wall defining an upper edge of said withdrawal slot and an end wall defining a lower edge of said withdrawal slot;

at least one film unit in said film container, said one film unit comprising a plurality of layers, including photosensitive and image-receiving layers, each having lateral edges, and a container of fluid processing composition at one end of said film unit, said one film unit being adapted to be advanced, container of fluid first, relative to the pressure-applying means of the apparatus with said plurality of layers in superposition for distributing said fluid between a predetermined pair of said plurality of layers, one of said plurality of layers defining a first exterior surface of said film unit and another of said plurality of layers defining a second exterior surface of said one film unit;

means associated with said film container for controlling the distribution of said fluid between said predetermined pair of layers, said distribution control means including resilient means integrally formed with said end wall for selectively engaging a medial portion of said first exterior surface intermediate said lateral edges to direct at least a portion of said fluid being distributed by the pressure-applying means of the apparatus towards said lateral edges of said predetermined pair of layers; and support means integrally formed with said forward wall of said film container for engaging said second exterior surface of said film unit and for supporting said one film unit while said resilient means is in engagement with said first exterior surface of said one film unit.

28. Photographic film assemblage as defined in claim 27 wherein said support means is configured to selectively engage only a medial portion of said second exterior surface.

29. Photographic film assemblage for use with photographic apparatus of the type including pressure-applying means for distributing a liquid processing composition within a film unit that is advanced relative to the pressure-applying means, said film assemblage comprising:

a container for holding at least one film unit, said container including a forward wall and an end wall which cooperate to define, respectively, upper and lower edges of a film withdrawal slot therebetween through which a film unit located in said container is adapted to be advanced to bring it into operative relationship with the pressure-applying means of the apparatus;

at least one film unit in said container, said one film unit comprising a plurality of superposed layers, including photosensitive and image-receiving layers, each having lateral edges, said one film unit being adapted to be advanced through said withdrawal slot with one of said plurality of layers adjacent said lower edge and into operative relationship with the pressure-applying means of the apparatus to distribute said fluid between a predetermined pair of said layers; and means associated with said container for controlling the distribution of said fluid between said predetermined layers as said film unit is advanced through said withdrawal slot and relative to the pressure-applying means of the apparatus, said distribution control means including means for engaging only a medial portion of said one layer and for urging said medial portion towards said upper edge of said withdrawal slot to direct a portion of said fluid towards said lateral edges of said predetermined pair of layers, said engaging and urging means including a resilient finger integrally formed with said end wall of said film container and extending part way across said withdrawal slot upwardly from said lower edge towards said upper edge.

30. Photographic film assemblage as defined in claim 29 wherein said distribution control means further includes support means for supporting said one film unit while said one layer is engaged by said finger.

31. Photographic film assemblage as defined in claim 30 wherein said support means includes an interior surface of said forward wall adjacent said withdrawal slot.

* * * * *